Jan. 8, 1952 W. G. ZIMMERMAN 2,581,744
HEATING AND COOLING AIR CONDITIONING SYSTEM
Filed June 2, 1949

INVENTOR.
WILLIAM G. ZIMMERMAN
BY
Williamson Williamson
ATTORNEYS

Patented Jan. 8, 1952

2,581,744

UNITED STATES PATENT OFFICE 2,581,744

HEATING AND COOLING AIR CONDITIONING SYSTEM

William G. Zimmerman, Paynesville, Minn.

Application June 2, 1949, Serial No. 96,740

1 Claim. (Cl. 62—6)

This invention relates to a combined heating and cooling system incorporating the reverse refrigeration cycle principle.

While it is true that certain combined heating and cooling units have been used in the past, none of these has been adapted to successful use in the extreme climates of the northern states. It has been extremely difficult to provide a system which will supply sufficient heat to permit effective heating in the winter without providing a system which will have excessive cooling capacity in the summer.

It is an object of my invention to provide a novel and improved relatively simple combined heating and cooling system particularly adapted for use in extreme climates.

It is another object to provide a combined heating and cooling air conditioning system using a split heat transfer coil arrangement so that considerably more heating than cooling capacity is provided.

More specifically, it is an object to provide a heating and cooling system adapted to work in combination with a reverse cycle refrigeration arrangement which supplies refrigerant to said system through a plurality of control valves and expansion valves which are adapted to selectively heat and cool a room or building, the heat transfer coils of the system being split into two parts to provide substantially more heating than cooling capacity to permit successful use in extremely cold climates.

It is a further object to provide a split heat transfer coil structure submerged in a tank through which water is continuously circulated.

It is still a further object of my invention to provide a split heat transfer coil buried below the ground surface and adapted to receive heat therefrom or to give off heat thereto depending upon the direction of flow of the refrigerant therethrough to permit greater heating than cooling capacity for the system.

These and other objects and advantages of my invention will more fully appear from the following description made in connection with the accompanying drawings wherein like reference characters refer to similar parts throughout the several views and in which.

Figures 1, 2:
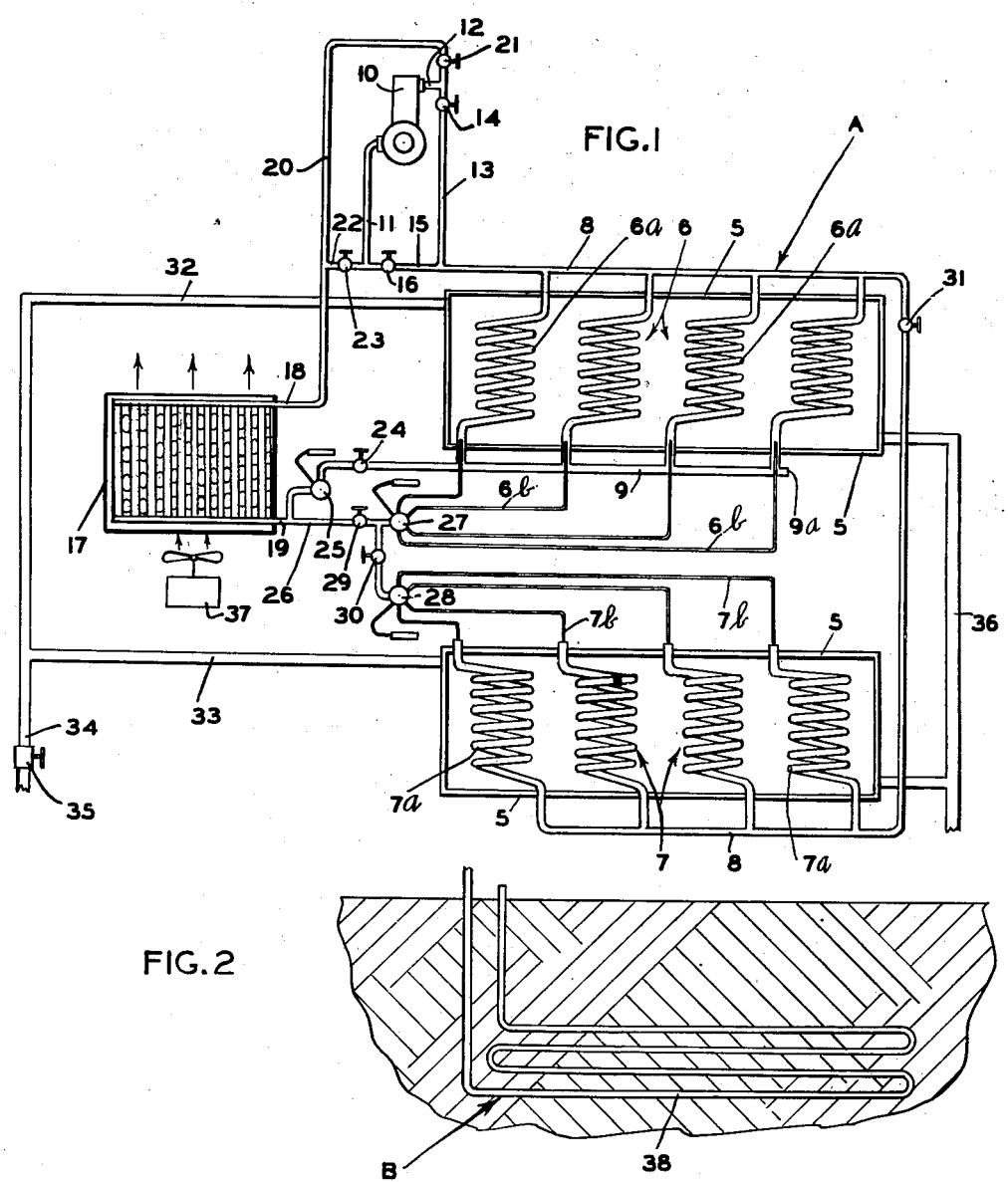
Fig. 1 is a diagrammatic view of my improved air conditioning system.
Fig. 2 is a fragmentary diagrammatic view of an alternative form of heat transfer coil shown embedded below the ground surface.

As shown diagrammatically in Fig. 1, a pair of liquid tanks 5, which could, of course, be made in the form of a single tank, is provided. Two sets or banks of tubular coils 6 and 7, each comprising a plurality of coils 6a and 7a, are respectively submerged in the tanks 5, and one end of each individual coil is connected with a suitable refrigerant manifold conduit 8. A refrigerant collection manifold conduit 9 is connected to the other ends of the coils 6a in bank 6 and has as a closed end 9a.

A compressor 10 is provided having a suction inlet conduit 11 and discharge outlet conduit 12 connected therewith. The outlet conduit 12 is connected with refrigerant conduit 8 by a cooling supply conduit 13 with a valve 14 interposed therein. The suction conduit 11 is connected with refrigerant conduit 8 by a heating return conduit 15 which has a valve 16 interposed therein. An air conditioning heat transfer unit 17 in the form shown has a refrigerant carrying heat transfer core and a pair of refrigerant carrying openings 18 and 19. A heating supply conduit 20 interconnects the compressor discharge 12 with the core opening 18, and a valve 21 is interposed in said conduit 20. A cooling return conduit 22 interconnects suction conduit 11 with opening 18, and a valve 23 is interposed in said conduit 22.

The opening 19 is connected with the collection manifold 9, and a shut off valve 24 and thermostatic expansion valve 25 are interposed in series in said conduit 9. A heating coil-supply conduit 26 interconnects opening 19 with a pair of thermostatic expansion valves 27 and 28 which respectively supply the two banks of coils 6 and 7 through the capillary tubes 6b and 7b respectively. A pair of shut-off valves 29 and 30 and interposed into the conduit 26 to control the flow through the respective expansion valves 27 and 28, and a shut-off valve 31 is interposed into the manifold conduit 8 between coils 6 and coils 7.

The system is set up in the following manner for the heating cycle: Valves 16, 21, 29, 30 and 31 are opened, and the valves 14, 23, and 24 are all closed. This permits the refrigerant gas to flow from the compressor 10 through conduit 12, valve 21, conduit 20, and opening 18 to the air conditioning heat transfer core 17. From there the condensed gas flows through conduit 26, valves 29 and 30, and thermostatic expansion valves 27 and 28 through capillary tubes 6b and 7b to the respective coils 6 and 7 and back to the compressor through manifold conduit 8 and suction conduit 11 to the compressor 10. It should be noted that the tanks 5 have water as from a pump or suitable source of supply constantly circulating therethrough during the operation of the system. The tanks 5 are respectively supplied with water from the supply pipes 32 and 33, which receive water from the main supply line 34 having a shut-off valve 35, and the outlet pipe 36 is disposed a predetermined distance above the tank bottoms to maintain a predetermined water level therein and carries the overflow water away from said tanks. The warm refrigerant gas passing into the air conditioning unit 17 gives off heat to the air circulated therethrough by the fan 37 and condenses in the core thereof. This condensed gas passes through the expansion valves 27 and 28 where it is cooled considerably and thereafter through the coils 6a and 7a around which the relatively warm water is circulating. Said coils heat the gas which passes back therefrom to the compressor which further heats the same by compression thereof. The coils 6 and 7 act as an evaporator during this heating cycle.

During the cooling cycle the valves 16, 21, 29, 30 and 31 are closed, and the valves 14, 23 and 24 are opened so that the hot compressed gas from compressor discharge conduit 12 flows downwardly through supply conduit 13, manifold conduit 8, and into the other bank of coils 6 which serves as a condenser, and from said coils the condensed gas travels into the conduit 9 through open valve 24 and thermostatic expansion valve 25 and into the opening 19 of the air conditioning heat exchanger unit 17 which serves as an evaporator to cool the air blown therethrough by fan 37. Evaporated gas passes out through opening 18 into conduit 22 and back into the compressor 10 through conduit 11. The relatively cold circulating water in the tank 5 surrounding the bank of coils 6 cools the warm compressed gas and condenses the same to provide more efficient cooling in the air conditioning unit 17 during evaporation therein. The form of heat transfer coils illustrated in Fig. 1 will be designated as form A of the invention.

The form of coils illustrated in Fig. 2 will be designated as form B of the invention, and in this form the coils will be designated by the numeral 38. These coils 38 are arranged in a pair of banks similar to banks 6 and 7 with the identical valve arrangement illustrated for form A of the invention so that more heating than cooling capacity will be provided. The ground serves to supply heat during the heating cycle and serves to cool and condense the gas during the cooling cycle in exactly the same manner as the circulating water heats and cools the gas during the heating and cooling cycles described above.

It should be noted that by splitting the heat transfer coil units, any desired relation may be maintained between the heating and cooling capacity of the system and also that by circulating the water such as well water through the tanks 5, the capacity of the coils therein to transfer or receive heat is considerably increased, and therefore the efficiency of the system is materially increased by said circulating water.

It will be seen that I have provided a relatively simple heating and cooling air conditioning system incorporating a reverse cycle refrigeration arrangement. The split coil arrangement permits a highly efficient system to be provided for extremely cold climates where the variation in degrees from summer to winter is as much as 120°. This feature in combination with the highly effective heat transfer system afforded by the circulating water around the coils shown in form A of the invention permits successful operation of my system in climates where previously designed systems have not proved satisfactory. In form B of the invention, the coils 38 must be of considerably longer length and heat transfer capacity than those used in form A of the invention which are surrounded by circulating water, but if sufficient heat transfer capacity is provided by the coils 38, this form will also work satisfactorily with my split coil arrangement in the extreme climates.

It will, of course, be understood that various changes may be made in the form, details, arrangement and proportions of the parts without departing from the scope of my invention.

What I claim is:

A heating and cooling system for varying air temperatures, said system comprising a pair of heat transfer units, one of said heat transfer units being divided into two sections and the other serving as an air conditioning unit, a reverse cycle refrigeration system having said heat transfer units directly connected therein, a line structure running from said air conditioning unit to said two sections of the other heat transfer unit, means for expanding the gas running through said line structure, a second line structure running from one section of said heat transfer unit to the other heat transfer unit and having thermostatic expansion means interposed therein, said air conditioning unit acting as a condenser in said system during the heating cycle and as an evaporator during the cooling cycle, both sections of said other heat transfer unit serving as an evaporator during the heating cycle and only one section serving as a condenser during the cooling cycle, a body of circulating liquid surrounding both sections of said last mentioned heat transfer unit, and valve means for controlling the cycle of operation of said system.

WILLIAM G. ZIMMERMAN.

REFERENCES CITED

The following references are of record in the file of this patent:

UNITED STATES PATENTS

| Number | Name | Date |
|---|---|---|
| 1,935,281 | Reed | Nov. 14, 1933 |
| 2,428,876 | Hawkins | Oct. 14, 1947 |

FOREIGN PATENTS

| Number | Country | Date |
|---|---|---|
| 59,350 | Switzerland | Feb. 13, 1912 |